United States Patent [19]

Reichmuth et al.

[11] Patent Number: 4,676,329
[45] Date of Patent: Jun. 30, 1987

[54] WEIGHING APPARATUS INCLUDING AUXILIARY TARE STORE MEANS

[76] Inventors: Arthur Reichmuth, Im Neuguet 6, CH-8620 Wetzikon; Hanspeter Wachter, Bettlistrasse 14, CH 8600 Düberdorf, both of Switzerland

[21] Appl. No.: 920,131

[22] Filed: Oct. 17, 1986

[30] Foreign Application Priority Data

Oct. 18, 1985 [CH] Switzerland ............... 4500/85

[51] Int. Cl.⁴ ............................................. G01G 23/14
[52] U.S. Cl. ..................................................... 177/165
[58] Field of Search ............................................ 177/165

[56] References Cited

U.S. PATENT DOCUMENTS

| | | |
|---|---|---|
| 3,727,706 | 4/1973 | Streater et al. .................. 177/165 X |
| 3,786,883 | 1/1974 | Kunz . |
| 3,788,410 | 1/1974 | Allenspach et al. . |
| 3,796,884 | 1/1974 | Allenspach . |
| 3,860,077 | 1/1975 | Utzinger et al. . |
| 4,114,706 | 9/1978 | Realini et al. . |
| 4,117,898 | 10/1978 | Moriyama ........................... 177/165 |
| 4,328,875 | 5/1982 | Lechner . |
| 4,390,074 | 6/1983 | Vogel ................................... 177/165 X |

Primary Examiner—George H. Miller, Jr.
Attorney, Agent, or Firm—Laubscher & Laubscher

[57] ABSTRACT

A weighing apparatus of the tare-type is disclosed including a subtractor connected between the weighing scale output and an indicating device, a first tare store being provided having an input connected by a taring switch with the weighing scale output, and an output connected with a second input of the subtractor, characterized by the provision of an auxiliary tare store connected with the first tare store via a transfer switch that is ganged for operation generally simultaneously with the taring switch, thereby to transfer the first tare signal to the auxiliary store. An erasing switch is operable, as desired, to return the first tare signal from the auxiliary store to the first tare store. The taring and transfer switches are so operable that the closing of the contacts of the taring switch is delayed relative to the closing of the contacts of the transfer switch, whereby the first taring signal in the first tare store is transferred to the auxiliary store before a subsequent weight signal is supplied to the first tare store.

3 Claims, 2 Drawing Figures

WEIGHING APPARATUS INCLUDING AUXILIARY TARE STORE MEANS

This invention relates to an improved electrical weighing scale system of the tare type including an auxiliary tare store means connected with the first tare store via a normally open transfer switch ganged for operation generally simultaneously with the taring switch, thereby to prevent inadvertent loss of a given value.

Taring systems are well known in the electrical weighing scale art, as evidenced, for example, by the prior U.S. patents to Kunz U.S. Pat. No. 3,786,838, Allenspach U.S. Pat. No. 3,786,884, Allenspach et al U.S. Pat. No. 3,788,410, Realini et al U.S. Pat. No. 4,114,706, and Lechner U.S. Pat. No. 4,328,875 (each assigned to the same assignee as the present invention).

These known taring systems are used not only for the purpose of considering the tare at the beginning of the weighing operation (i.e., the deadload weight plus the weight of the packaging), but also, by repeatedly activating the taring switch, to perform the weighing-in of several components introduced successively into a container with the indication of the net addition in each case.

In practice, however, it has been determined that, during the weighing-in of the components, inadvertent mishandlings may take place in that, for example, the taring switch is activated by mistake prior to the attainment of the required weight of a component. The preceding tare value is thus inadvertently erased from the tare storage unit and is replaced by the new tare value. This eliminates the possibility of supplementing the weight of the last-weighed component up to the required weight. A weighing substance with components that cannot be separated from each other (i.e., a mixture of liquids, for example) subsequently cannot be used further in this state.

During a simple weighing operation, unintentional activation of the taring switch can also be disadvantageous if the contents of a container must first be removed from said container in order again to determine the tare value anew. Emptying can then, for example, be rather troublesome when one works with a very heavy or otherwise difficultly handled container or when the contents, for example, a viscous liquid, can be removed completely from the container only with a major effort.

The basic purpose of the present invention is to improve the taring system of an electrical scale in such a manner that it will make it possible to reverse an erroneously performed taring operation.

SUMMARY OF THE INVENTION

Accordingly, a primary object of the present invention is to provide an improved weighing apparatus of the tare type including, in addition to a first tare store having an output connected with a subtractor connected between the weighing scale output and the indicating means, an auxiliary store means having an input connected with the first store means via a transfer switch that is generally simultaneously operable with the taring switch that connects the scale output with the input to the first store means. Consequently, upon operation of the taring switch, the weight signal in the first store means is transferred automatically to the auxiliary store means via the transfer switch, and, if desired, this first weight signal can be returned to the first store means by operation of an erase or reset switch contained in a feedback path from the output of the auxiliary store means to an input of the first store means.

With the use of the auxiliary store unit, one can make sure that, upon activation of the taring switch, the tare value, previously stored in the tare storage unit, will not be lost and, in case of need, can be retrieved and returned to the tare storage unit. If several prior tare values are to remain accessible, then one can provide several additional storage units into which these tare values are stored, for example, in sequence, and from which they can again be supplied to the tare storage unit in the reverse sequence.

According to a more specific object of the invention, the closing of the contacts of the taring switch is slightly delayed relative to the closing of the contacts of the simultaneously operated transfer switch, thereby to assure that the prior tare value in the first store means is transferred to the second store means before a subsequent weight signal is supplied to the first store means.

BRIEF DESCRIPTION OF THE DRAWINGS

Other objects and advantages of the invention will become apparent from a study of the following specification, when viewed in the light of the accompanying drawings, in which.

DETAILED DESCRIPTION

Figure 1:
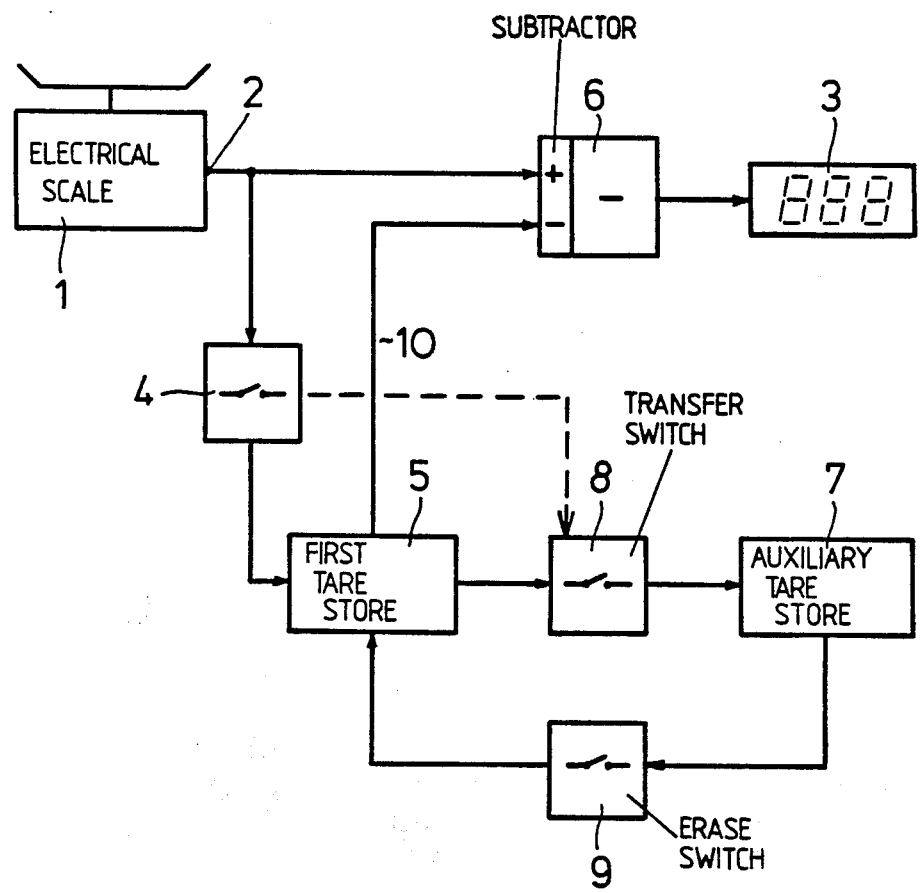
FIG. 1 is an electrical diagrammatic representation of the tare-type weighing system of the present invention.

Referring now to the drawing, the improved weighing apparatus of the present invention includes a conventional weighing scale 1 having an output terminal 2 for supplying electrical weighing signals to the indicating means 3 via a conventional subtractor. First tare store means 5 are provided having a first input terminal connected with the weighing scale output terminal 2 via a normally open taring switch 4, and a first output connected by conductor 10 with a second input to the subtractor 6.

In accordance with a characterizing feature of the present invention, an auxiliary tare store means 7 is provided having an input connected with a second output of the first tare store means 5 via a normally open transfer switch 8 that is ganged for operation generally simultaneously with the taring switch 4. The output of auxiliary store means 7 is connected with a second input terminal of the first store means via a feedback path including a normally open erasing switch 9.

As is known in the taring scale art, the subtracting means 6 serve to subtract the weighing signal stored in the first tare store means 5 from the following weighing signals supplied by the weighing scale 1, and thereby supplies the difference signal, which represents a given net weight, to the indicating means 3.

Upon activation of tare switch 4, the instantaneous weighing signal is supplied to the tare store means 5 where it is both retained as a first tare value, and supplied to one input of the subtractor 6. The same instantaneous weighing signal is directly supplied to the other input terminal of the subtractor 6 so that the difference signal has the value zero. Consequently, any weight change on the scale causes the tare value, which is stored in the tare storage means 5, to be continually subtracted from the following weighing results, whereby the indicating means 3 displays the particular net value. The first tare value which has been introduced into the first tare storage unit 5 is thus retained until the taring switch 4 is activated once again, as a result of which the tare value, which until now has been stored in tare storage unit 5, is replaced by the new instantaneous weighing signal, and the indicating device 3 once again displays the value zero.

As distinguished from the prior systems wherein the replaced tare value was lost, the auxiliary tare store means 7 of the present invention receives and retains the first tare value replaced in the tare storage unit 5. To this end, the closing of the contacts of taring switch 4 is slightly delayed relative to the closing of the contacts of the simultaneously operated transfer switch 8, whereby the transfer switch 8 is closed slightly before tare switch 4. In other words, upon each activation of taring switch 4, the weighing signal, which in each particular case has been stored in tare store means 5, is transferred to the auxiliary store means before the new tare value is received into the first tare store means 5. The erasing switch 9 is now used for the purpose of reversing a prior taring operation in that, upon each activation of erasing switch 9, the first weighing signal, which in each case is stored in the auxiliary store means 7, is returned to the tare store means 5, so that the net weight, indicated prior to the last taring operation, again appears in the indication device 3. In this way, one can avoid the disadvantages which previously were produced by the known systems.

Figure 2:
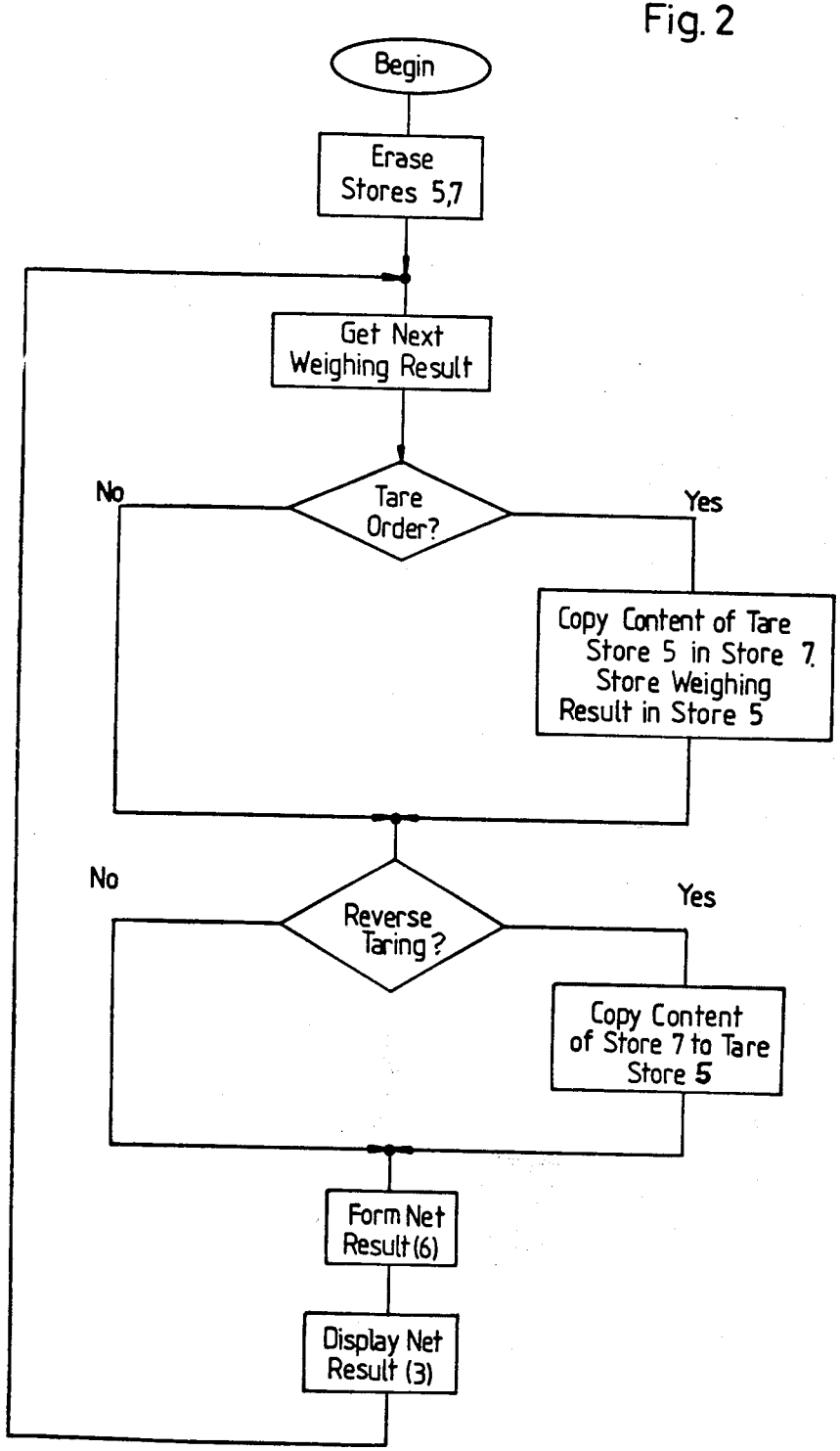
FIG. 2 is a sequence diagram showing the functions contemplated by the invention using a microprocessor system.

Though for clarity reasons the present invention has been described in connection with separate store elements, it is to be understood that actually the various store means may be elements of a RAM of a microprocessor system. This microprocessor system will then also control switching functions described hereinbefore, as shown in FIG. 2.

What is claimed is:

1. In a weighing apparatus of the taring type including a subtractor (6) connected between the output (2) of an electrical scale (1) and weight indicator means (3), and a taring switch (4) operable to connect the weighing scale output with the input of a first tare store means (5) the output of which is connected with a second input to the subtractor;

the improvement which comprises
(a) auxiliary tare store means (7);
(b) transfer switch means (8) operable generally simultaneously with said taring switch for transferring the value of said first tare store means to said auxiliary tare store means; and
(c) erasing switch means (9) operable to return to said first store means the value contained in said auxiliary tare store means.

2. Apparatus as defined in claim 1, wherein each of said taring, transfer and erasing switches is normally open, said taring and transfer switches being ganged for simultaneous operation.

3. Apparatus as defined in claim 2, wherein said taring and transfer switches include pairs of normally open switch contacts, said taring and transfer switches being so operable that the closing of the switch contacts of said taring switch is slightly delayed relative to the closing of the contacts of said transfer switch, whereby a weight value stored in said first transfer store means is transferred to said auxiliary store means before a subsequent weight value is supplied to said first tare store means via said taring switch.

* * * * *